(12) United States Patent
Cowlishaw

(10) Patent No.: US 8,066,054 B2
(45) Date of Patent: Nov. 29, 2011

(54) MEASURING SYSTEM FOR CONTINUOUS CASTING MACHINES

(75) Inventor: Richard Cowlishaw, Sheepbridge (GB)

(73) Assignee: Sarclad Limited, Sheepbridge (GB)

( * ) Notice: Subject to any disclaimer, the term of this patent is extended or adjusted under 35 U.S.C. 154(b) by 70 days.

(21) Appl. No.: 12/514,274

(22) PCT Filed: Nov. 23, 2007

(86) PCT No.: PCT/GB2007/004519
§ 371 (c)(1),
(2), (4) Date: May 8, 2009

(87) PCT Pub. No.: WO2008/065371
PCT Pub. Date: Jun. 5, 2008

(65) Prior Publication Data
US 2010/0282431 A1 Nov. 11, 2010

(30) Foreign Application Priority Data
Nov. 28, 2006 (GB) .................................. 0623755.6
Jan. 4, 2007 (GB) .................................. 0700070.6

(51) Int. Cl.
B22D 11/20 (2006.01)
(52) U.S. Cl. .......................... 164/454; 164/452; 164/455
(58) Field of Classification Search .................. 164/454, 164/452, 455
See application file for complete search history.

(56) References Cited

U.S. PATENT DOCUMENTS
6,776,217 B1 * 8/2004 Streubel et al. ............... 164/454

FOREIGN PATENT DOCUMENTS
| DE | 94 10 873 U1 | 9/1994 |
| EP | 1 128 921 A | 9/2001 |
| JP | 56 160606 A | 12/1981 |
| JP | 2001 047205 A | 2/2001 |

OTHER PUBLICATIONS
PCT International Search Report, Feb. 26, 2008.
PCT Written Opinion of the International Searching Authority, Sep. 2, 2009.

* cited by examiner

Primary Examiner — Kevin P Kerns
Assistant Examiner — Erin Saad
(74) Attorney, Agent, or Firm — Westman, Champlin & Kelly, P.A.; Z. Peter Sawicki

(57) ABSTRACT

A measuring system for measuring the strand condition of a continuous casting machine, the system comprising a plate member mounted on a caster chain (10) in use, the plate member (12) having an edge (14) that protrudes outwardly from one surface (13) of the caster chain (10); a pivotally mounted arm (16) capable of protruding outwardly from the opposing surface (17) of the caster chain (10); and means to determine the distance between the tip (18) of the arm (16) and the plate edge (14) at any given interval during use.

7 Claims, 2 Drawing Sheets

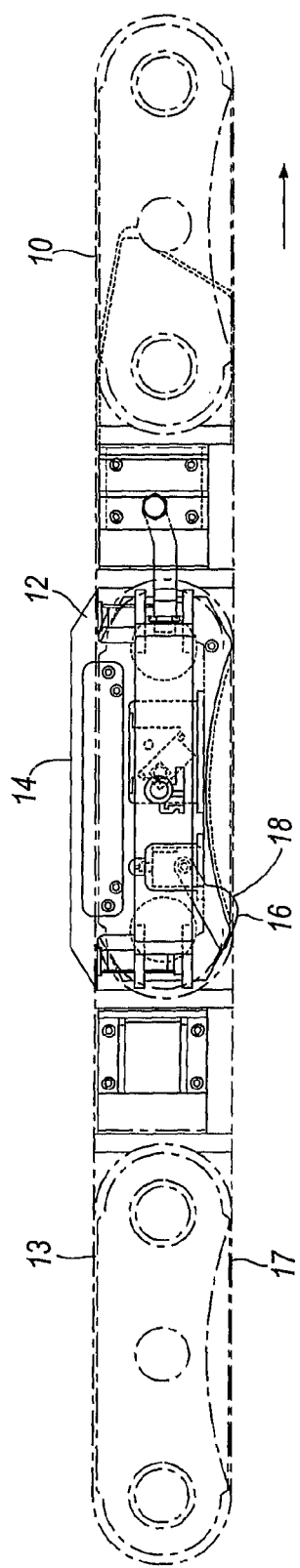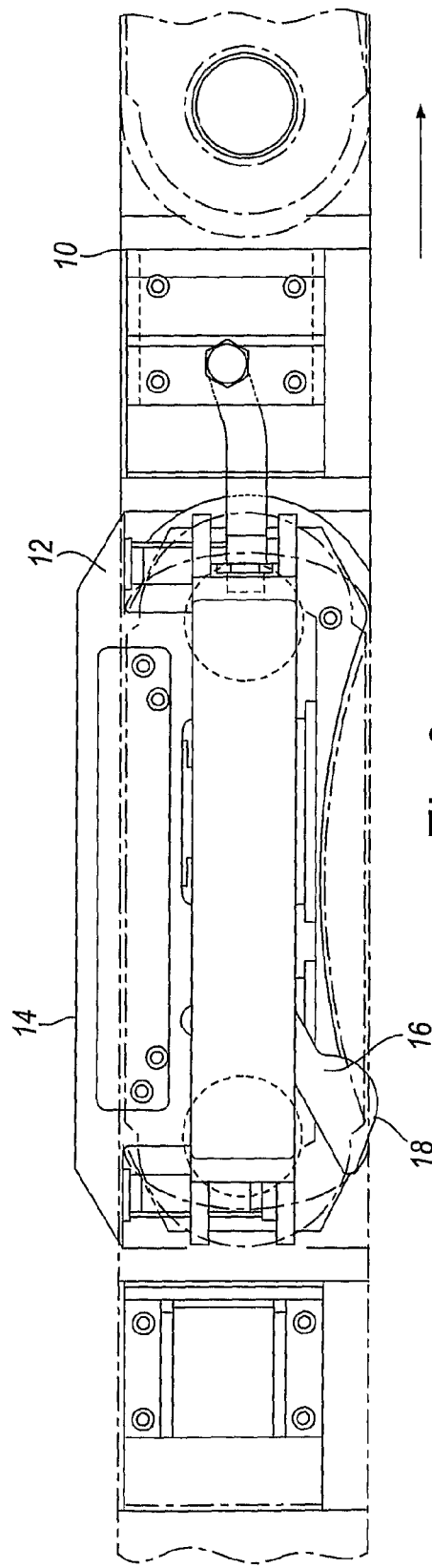

US 8,066,054 B2

MEASURING SYSTEM FOR CONTINUOUS CASTING MACHINES

CROSS-REFERENCE TO RELATED APPLICATION

This Application is a Section 371 National Stage Application of International Application No. PCT/GB2007/004519, filed Nov. 23, 2007 and published as WO 2008/0065371 A1 on Jun. 5, 2008, the content of which is hereby incorporated by reference in its entirety.

BACKGROUND OF THE INVENTION

The present invention relates to a measuring system for continuous casting machines. More especially, the invention relates to a system of measuring and monitor the strand condition of a continuous casting machine while the machine is on-line.

The monitoring of the strand condition of continuous casting machines to provide accurate measurement of the critical strand parameters such as the roll gap, outer roll alignment and water cooling efficiency is vital.

The applicant currently markets a Strand Condition Monitor which has proven to be very successful in providing reasonably accurate measurements of the strand parameters. Such a monitoring device is disclosed in the applicant's earlier patent no. EP1128921.

The patent discloses a monitoring assembly that replaces a traditional dummy bar head at the front of the chain that pulls steel blanks through a caster. A problem associated with this system is that it can only be installed, used and detached when the casting machine is offline. A substantial amount of time and expense is wasted during the time when the machine is off-line.

SUMMARY OF THE INVENTION

The present invention seeks to alleviate the aforementioned problem by providing a strand monitoring system that can be incorporated into a caster chain and that can be used whilst the casting machine is online.

Accordingly, in one aspect there is provided a measuring system for measuring the strand condition of a continuous casting machine, the system comprising a plate member mounted on a caster chain in use, the plate member having:

an edge that protrudes outwardly from one surface of the caster chain;

a pivotally mounted arm capable of protruding outwardly from the opposing surface of the caster chain; and means to determine the distance between the tip of the arm and the plate edge at any given interval during use.

The term "measuring" is intended to include monitoring of the strand condition to identify any abnormalities along the caster.

Preferably the edge of the plate member protrudes outwardly from a bottom surface of the chain and the arm extends, in use, outwardly from the top surface of the chain.

Preferably the system includes means to communicate the calculated distances to a remote processor for displaying to a user. The calculated distances could, of course, be communicated to a user by any known communication means.

Preferably the pivotal arm is spring-loaded and biased to an outwardly extending position.

Preferably, the edge of the plate member maintains, during use, at least two points of contact with two or more rollers mounted on a frame of the caster. Preferably still the tip of the arm protrudes outwardly to come into contact with one more rollers mounted on the opposing frame of the caster, thereby to enable determination of the distance between the rollers on each frame.

Preferably the system comprises two plate members mounted across the width of the chain.

According to a second aspect, there is provided a method of measuring the strand condition of a continuous casting machine, the method comprising the steps of:

mounting a plate member on a chain of the casting machine such that an edge of the plate member extends outwardly from one surface of the chain;

mounting a pivotal arm on the plate member such that a tip of the arm is capable of extending outwardly from an opposing surface of the chain; and calculating at pre-determined intervals the distance between the edge of the plate member and the tip of the arm as the chain moves through the casting machine.

It is clearly envisaged that the same or similar method could be used while the casting machine is off-line.

BRIEF DESCRIPTION OF THE DRAWINGS

One embodiment of the invention will now be described by way of example, with reference to the accompanying Figures of which:

FIG. 2 is a side view of the chain of FIG. 1; and

FIG. 3 is a magnified view of FIG. 2 specifically showing the monitoring system.

DETAILED DESCRIPTION OF ILLUSTRATIVE EMBODIMENTS

Figure 1:
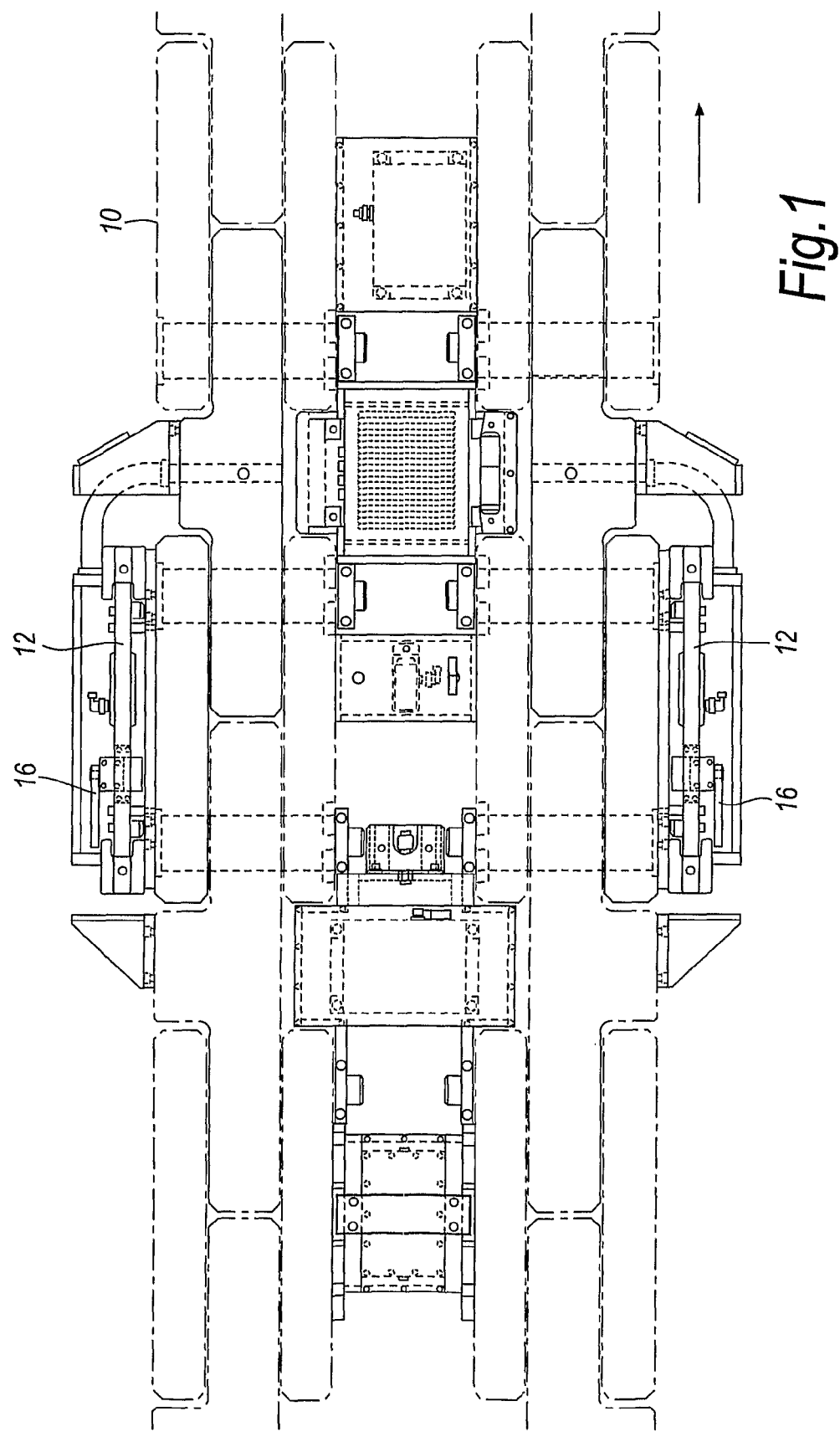
FIG. 1 is a plan view of a chain 10 for a continuous casting machine including a strand condition monitoring system constructed in accordance with the present invention.

FIG. 1 is a plan view of a chain for a continuous casting machine. The majority of the components of the chain 10 are standard and well-established in the field and so for the purposes of this description, only the features relevant to the present invention will be described. In use, the chain 10 pulls steel blanks (not shown) through a casting machine in the direction shown by the arrow.

In the figures, the dummy bar chain 10 is shown upside down as this is the normal stance of the chain prior to loading into the casting machine. During use, the chain 10 will turn through 90° followed by a further 90° during measurement of the caster.

The chain 10 and steel blanks travel through the caster which has, traditionally, a series of rollers mounted on the top and bottom frames.

The monitoring system, which is best described with reference to FIGS. 2 and 3, comprises a plate member or blade 12 that is mounted on a side surface of the chain 10. The plate 12 is independently spring-mounted on the chain 10. The plate 12 protrudes slightly from the outer face (bottom surface) 13 of the chain 10 providing an elongate edge 14 which, in use, contacts the rollers mounted in the bottom/outer frame of the caster. The edge 14 is of sufficient length to enable at least two points of contact with the rollers thereby ensuring that the edge 14 is, and remains, stable and tangential across adjacent rollers.

The plate 12 includes an arm 16 pivotally mounted thereon and located in a position such that the arm 16 can pivot or swing to a position whereby the arm 16 protrudes upwardly from the inner face (top surface) 17 of the chain 10. The arm 16 may be mounted on the plate 12 with a spring mechanism which may bias the arm 16 in a upward position.

In use, the arm 16 has a tip 18 that contacts the rollers mounted on the top frame (the inner face) of the castor.

As can be seen from FIG. 1, a plate 12 with an associated arm 16 is mounted across the width of the chain 10.

The plate 12 is pivotally attached to the side surface of the chain 10 and is sprung independently to allow the plate 12 to effectively "float" with respect to the chain 10. This ensures that any kinks and movements in the chain 10 as it travels through the caster will not affect the contact between the edge 14 of the plate 12 and the tip 18 of the arm 16 with the top and bottom rollers respectively.

The edge 14 of the plate 12 provides a definitive accurate datum point from which the distance between the edge 14 and the tip 18 of the arm 16 can be accurately and continuously measured using standard sensing devices and associated electrical circuitry mounted on the chain 10.

Data relating to the continuous measurement of the caster rollers is then transmitted to a remote processor for processing and ultimately for display to an engineer.

The above described embodiment is given by way of example only, and the skilled reader will naturally appreciate that many variations could be made thereto without departing from the scope of the present invention.

It is, for example, clearly envisaged that the edge 14 of the plate 12 could protrude from the inner face 17 of the chain 10 and the arm 16 from the outer face 13. Alternatively one or more plates could be mounted on the inner and outer surfaces 17, 13 of the chain 10.

Although the present invention has been described with reference to preferred embodiments, workers skilled in the art will recognize that changes may be made in form and detail without departing from the spirit and scope of the invention.

The invention claimed is:

1. A measuring system for measuring the strand condition of a continuous casting machine, the continuous casting machine comprising an upper frame and a lower frame on each of which is mounted a first and second series of rollers respectively, the measuring system comprising:

a caster chain on one side surface of which is pivotally attached a plate member;

the plate member including a pivotally mounted arm which projects outwardly from one surface of the plate member and includes a tip which, in use, makes contact with a roller of one of the first series of rollers, the plate member further comprising an elongate edge that protrudes outwardly from the surface of the caster chain opposed to that from which the plate member tip projects and is of a length sufficient to maintain points of contact with at least two adjacent rollers of the second series of rollers; and sensors for determining the distance between the tip of the arm and the edge of the plate at any given interval during use of the system, whereby, in use of the measuring system, the edge of the plate member is and remains stable and tangential across adjacent rollers of the second series of rollers to provide an accurate datum point between the edge of the plate member and the tip of the pivotally mounted arm.

2. The measuring system according to claim 1 wherein the edge of the plate member protrudes outwardly from a bottom surface of the chain and the arm extends, in use, outwardly from the top surface of the chain.

3. The measuring system according to claim 1 wherein the sensors communicate the calculated data to a remote processor for displaying to a user.

4. The measuring system according to claim 1 wherein the pivotal arm is spring-loaded and biased to an outwardly extending position.

5. The measuring system according to claim 2 wherein the system includes means to communicate the calculated distances to a remote processor for displaying to a user.

6. The measuring system according to claim 2 wherein the pivotal arm is spring-loaded and biased to an outwardly extending position.

7. The measuring system according to claim 3 wherein the pivotal arm is spring-loaded and biased to an outwardly extending position.

* * * * *

UNITED STATES PATENT AND TRADEMARK OFFICE
CERTIFICATE OF CORRECTION

PATENT NO. : 8,066,054 B2  Page 1 of 1
APPLICATION NO. : 12/514274
DATED : November 29, 2011
INVENTOR(S) : Richard Cowlishaw It is certified that error appears in the above-identified patent and that said Letters Patent is hereby corrected as shown below:

Claim 4, Column 4, Line 28: "where in" should be "wherein"
Claim 6, Column 4, Line 34: "where in" should be "wherein"
Claim 7, Column 4, Line 37: "where in" should be "wherein"

Signed and Sealed this
Fifteenth Day of May, 2012

David J. Kappos
*Director of the United States Patent and Trademark Office*